US012283406B1

(12) United States Patent
Sandvig et al.

(10) Patent No.: US 12,283,406 B1
(45) Date of Patent: Apr. 22, 2025

(54) ILLUMINABLE ELECTRICAL CORD

(71) Applicants: Jens P. Sandvig, Anacortes, WA (US); Gary H. Sandvig, Anacortes, WA (US)

(72) Inventors: Jens P. Sandvig, Anacortes, WA (US); Gary H. Sandvig, Anacortes, WA (US)

( * ) Notice: Subject to any disclaimer, the term of this patent is extended or adjusted under 35 U.S.C. 154(b) by 0 days.

(21) Appl. No.: 18/731,713

(22) Filed: Jun. 3, 2024

Related U.S. Application Data

(60) Provisional application No. 63/523,713, filed on Jun. 28, 2023.

(51) Int. Cl.

| | |
|---|---|
| ***H01B 9/00*** | (2006.01) |
| ***F21V 23/06*** | (2006.01) |
| ***H01B 3/30*** | (2006.01) |
| ***H01B 7/00*** | (2006.01) |
| ***H01B 9/02*** | (2006.01) |
| *F21Y 103/30* | (2016.01) |
| *F21Y 115/20* | (2016.01) |

(52) U.S. Cl.
CPC ............. *H01B 9/005* (2013.01); *F21V 23/06* (2013.01); *H01B 7/0009* (2013.01); *H01B 9/025* (2013.01); *F21Y 2103/30* (2016.08); *F21Y 2115/20* (2016.08); *H01B 3/30* (2013.01)

(58) Field of Classification Search
CPC ........ H05B 33/02; H05B 33/04; H05B 33/06; F21S 4/22-26; H01B 3/30; H01B 9/025; H01B 7/0009; H01B 7/005; F21Y 2115/20
See application file for complete search history.

(56) References Cited

U.S. PATENT DOCUMENTS

| | | | | |
|---|---|---|---|---|
| 4,597,033 | A | 6/1986 | Meggs et al. | |
| 7,121,707 | B2 | 10/2006 | Currie et al. | |
| 7,544,909 | B2 | 6/2009 | Dhir | |
| 8,167,471 | B1 | 5/2012 | Moritz | |
| 2013/0037323 | A1* | 2/2013 | Smith | H01B 7/36 174/75 R |
| 2020/0323052 | A1* | 10/2020 | Yin | H01B 7/0009 |
| 2021/0156531 | A1 | 5/2021 | Scroggins | |

FOREIGN PATENT DOCUMENTS

| | | | | |
|---|---|---|---|---|
| CA | 2039090 A1 | | 9/1992 | |
| CH | 694442 A5 | * | 1/2005 | H01B 7/366 |

OTHER PUBLICATIONS

Innovation Q+ NPL Search (Year: 2024).*

* cited by examiner

*Primary Examiner* — Anabel Ton
(74) *Attorney, Agent, or Firm* — John Rizvi; John Rizvi, P.A.—The Patent Professor®

(57) ABSTRACT

An illuminable electrical cord configured to emit light when connected to an electrical power source and an electric device may include a cord bundle. The cord bundle may have a first end and a second end. The first end of the cord bundle may be configured to electrically interface with an electrical power source. The second end of the cord bundle may be configured to electrically interface with the electric device. The cord bundle may include at least one electroluminescent (EL) wire segment. The EL wire segment may be configured to emit light from the cord bundle along at least a portion of the length of the cord bundle as the cord bundle conducts electrical current from the electrical power source.

21 Claims, 8 Drawing Sheets

ILLUMINABLE ELECTRICAL CORD

CROSS-REFERENCE TO RELATED APPLICATION

This application claims the benefit of U.S. Provisional Patent Application No. 63/523,713, filed on Jun. 28, 2023, which is incorporated herein by reference in its entirety.

FIELD OF THE INVENTION

The present invention relates generally to electrical cords, and more particularly, to an illuminable electrical cord which is configured to emit light when connected to an electrical power source.

BACKGROUND OF THE INVENTION

Electric devices such as power tools such as saws, drills, and the like may be operated by connecting the device to an external electrical power source (e.g., a wall power outlet) via an electrical wire or cord. The electrical cord transports electricity from the external electrical power source to the electric device, in order to power the device. In applications in which the work area is relatively far from the external electrical power source, an extension cord may be connected to the electrical cord of a device, resulting in an overall longer electrical cord assembly which is able to transport electricity from the relatively separated, external electrical power source and electric device.

In some cases, electric devices such as power tools such as saws, drills, and the like may be operated at or next to semi-dark environments such as crawlspaces, attics, and the like. Accordingly, an extension cord may need to be deployed through the dark or semi-dark environment to the work area. This may, however, require that a flashlight be carried to and from the work area to enable persons to see the extension cord as well as objects in the environment.

Conventional practice for illumination of dark or semi-dark environments through which extension cords may traverse may require that drop lights be suspended from the ceiling into the dark or semi-dark environment. One of the drawbacks of this method, however, is that electrical cords which supply electrical power to drop lights are not configured to deliver electrical power for tools. Moreover, drop lights may require an elevated support structure for their support from the ceiling. Even in lighted environments, extension cords may not be highly visible, and thus, easy to trip over.

Accordingly, there is need for an illuminable electrical cord which is configured to emit light when connected to an electrical power source.

SUMMARY OF THE INVENTION

The present invention is directed to an illuminable electrical cord which is configured to emit light when connected to an electrical power source. The illuminable electrical cord may include a cord bundle. The cord bundle may have a first end and a second end or may be hardwired to an electric device. The first end of the cord bundle may be configured to electrically interface with an electrical power source. The second end of the cord bundle may be configured to electrically interface with an electric device. The cord bundle may include at least one electroluminescent (EL) wire segment. The EL wire segment may be configured to emit light from the cord bundle along at least a portion of the length of the cord bundle as the cord bundle conducts electrical current from the electrical power source. Accordingly, in typical application, the first end of the cord bundle may be connected to the electrical power source. The electric device may be connected to the second end of the cord bundle. In some applications, at least a portion of the cord bundle may traverse through a dark or semi-dark environment. In other applications, the cord bundle may traverse through a lighted environment. As the illuminable electrical cord remains connected to the electrical power source, the cord bundle may conduct electrical current from the electrical power source to the EL wire segment of the cord bundle. The EL wire segment may emit light which renders the cord bundle more visible.

In an illustrative implementation of the invention, an illuminable electrical cord which is configured to emit light when plugged into or otherwise connected with an electrical outlet may include a cord sheath. A cord bundle may extend through the cord sheath. The cord bundle may have a first end and a second end or may be hardwired to an electric device. The first end of the cord bundle may be configured to electrically interface with an electrical power source. The second end of the cord bundle may be configured to electrically interface with an electric device. The cord bundle may include at least one electroluminescent (EL) wire segment. The EL wire segment may be configured to emit light from the cord bundle along at least a portion of the length of the cord bundle as the cord bundle conducts electrical current from the electrical power source. Accordingly, in typical application, the first end of the cord bundle may be connected to the electrical power source. The electric device may be connected to the second end of the cord bundle. In some applications, at least a portion of the cord bundle may traverse through a dark or semi-dark environment from the electrical power source to the electric device. In other applications, the cord bundle may traverse through a lighted environment. As the illuminable electrical cord remains connected to the electrical power source, the cord bundle may conduct electrical current from the electrical power source to the EL wire segment of the cord bundle. The EL wire segment may emit light which renders the cord bundle more visible. The cord bundle may simultaneously conduct electrical current from the electrical power source to the electric device.

In an illustrative implementation of the invention, an illuminable electrical cord which is configured to emit light when plugged into or otherwise connected to an electrical outlet to power an electric device may include a cord sheath. The illuminable electrical cord may be configured as an extension cord. A cord bundle may extend through the cord sheath. The cord bundle may have a first end and a second end or may be hardwired to an electric device. The first end of the cord bundle may be configured to electrically interface with an electrical power source. The second end of the cord bundle may be configured to electrically interface with an electric device. The cord bundle may include at least one electroluminescent (EL) wire segment. The EL wire segment may be configured to emit light from the cord bundle along at least a portion of the length of the cord bundle as the cord bundle conducts electrical current from the electrical power source. Accordingly, in typical application, the first end of the cord bundle may be connected to the electrical power source. The electric device may be connected to the second end of the cord bundle. In some applications, at least a portion of the cord bundle may traverse through a dark or semi-dark environment from the electrical power source to the electric tool. In other applications, the cord bundle may traverse through a lighted environment. As the illuminable electrical cord remains connected to the electrical power source, the cord bundle may conduct electrical current from the electrical power source to the EL wire segment of the cord bundle. The EL wire segment may emit light which renders the cord bundle more visible. The cord bundle may simultaneously conduct electrical current from the electrical power source to the electric device.

In another aspect, the cord sheath may include a cord sheath wall. The cord sheath wall may be light transmissive (transparent or translucent).

In another aspect, the cord bundle may include at least one power cord segment. The power cord segment may be configured to conduct the electrical current from the electrical power source. The EL wire segment may extend along and adjacent to the power cord segment.

In another aspect, the cord bundle may include a ground cord segment.

In another aspect, the at least one power cord segment of the cord bundle may include a first power cord segment and a second power cord segment.

In another aspect, the first power cord segment may include an electrically conductive core. The core may include at least one strand of an electrically conductive material such as copper. An electrically insulative cover may surround the core.

In another aspect, the second power cord segment may include an electrically conductive core. The core may include at least one strand of an electrically conductive material such as copper. An electrically insulative cover may surround the core.

In another aspect, the ground cord segment may include an electrically conductive core. The core may include at least one strand of an electrically conductive material such as copper. An electrically insulative cover may surround the core.

In another aspect, the cover of the first power cord segment, the cover of the second power cord segment and the cover of the ground cord segment may be color-coded.

In another aspect, the cover of the first power cord segment may be black, the cover of the second power cord segment may be white and the cover of the ground cord segment may be green.

In another aspect, the first end of the cord bundle may be a plug end. A power cord prong may be provided on each of the first power cord segment and the second power cord segment at the first end of the cord bundle. A plug ground prong may be provided on the ground cord segment at the first end of the cord bundle.

In another aspect, the second end of the cord bundle may be a socket end. A power cord socket clip may be provided on each of the first power cord segment and the second power cord segment at the second end of the cord bundle. A socket ground cavity may be provided on the ground cord segment at the second end of the cord bundle.

In another aspect, a first extending end and a second extending end of the core of the first power cord segment may extend beyond the cover of the first power cord segment at the first end and the second end, respectively, of the cord bundle. The corresponding one of the power cord prongs may electrically interface with the first extending end. The corresponding one of the power cord socket clips may electrically interface with the second extending end.

In another aspect, a first extending end and a second extending end of the core of the second power cord segment may extend beyond the cover of the second power cord segment at the first end and the second end, respectively, of the cord bundle. The corresponding one of the power cord prongs may electrically interface with the first extending end. The corresponding one of the power cord socket clips may electrically interface with the second extending end.

In another aspect, an insertion segment may extend from each power cord prong. The insertion segments of the power cord prongs may receive the corresponding first extending ends of the respective cores of the first and second power cord segments at the first end of the cord bundle.

In another aspect, an insertion segment may extend from each power cord socket clip. The insertion segments of the power cord socket clips may receive the corresponding second extending ends of the respective cores of the first and second power cord segments at the second end of the cord bundle.

In another aspect, an insertion segment may extend from the plug ground prong. An insertion segment may extend from the socket ground cavity. The insertion segment and the insertion segment may receive the first extending end and the second extending end, respectively, of the core of the ground cord segment.

In another aspect, a first extending end and a second extending end may extend from the core of the ground cord segment at the first end and the second end, respectively, of the cord bundle. The plug ground prong and the socket ground cavity may electrically interface with the first extending end and the second extending end, respectively.

In another aspect, a first extending end and a second extending end may extend from the core of the ground cord segment at the first end and the second end, respectively, of the cord bundle. The plug ground prong and the socket ground cavity may electrically interface with the plug core extension and the second extending end, respectively.

In another aspect, a power cord plug may be provided at the first end of the cord bundle. The power cord prongs and the plug ground prong may extend from the power cord plug.

In another aspect, a power cord socket may be provided at the second end of the cord bundle. The power cord socket clips and the ground cavity may be provided in the power cord socket.

In another aspect, the electrical power source may include an electrical outlet.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments, unless the claims state otherwise. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. As used throughout the specification and claims, the term "comprising" can also encompass the terms "consisting essentially of" and "consisting of". The term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 10% of the stated value or range in either direction.

Shown throughout the figures, the present invention is directed toward an illuminable electrical cord which is configured to emit light when connected to an electrical power source, and to simultaneously transport electrical power from the electrical power source to power an electric device.

Figure 1:
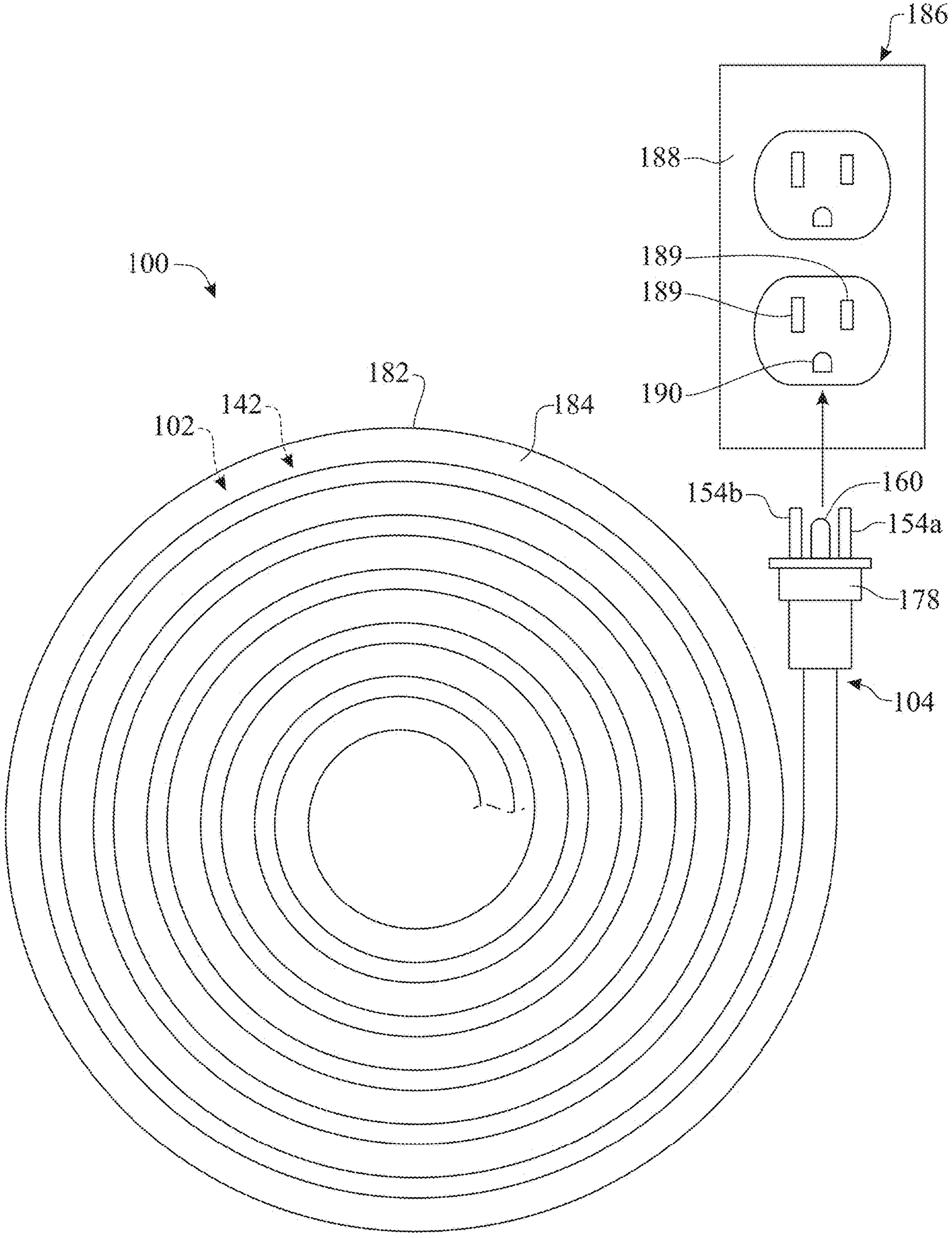
FIG. 1 presents a top view of a segment of the illuminable electrical cord in accordance with an illustrative embodiment of the present invention, more particularly illustrating typical insertion of a power cord plug on the cord into an electrical outlet in typical application of the cord.
Figure 2:
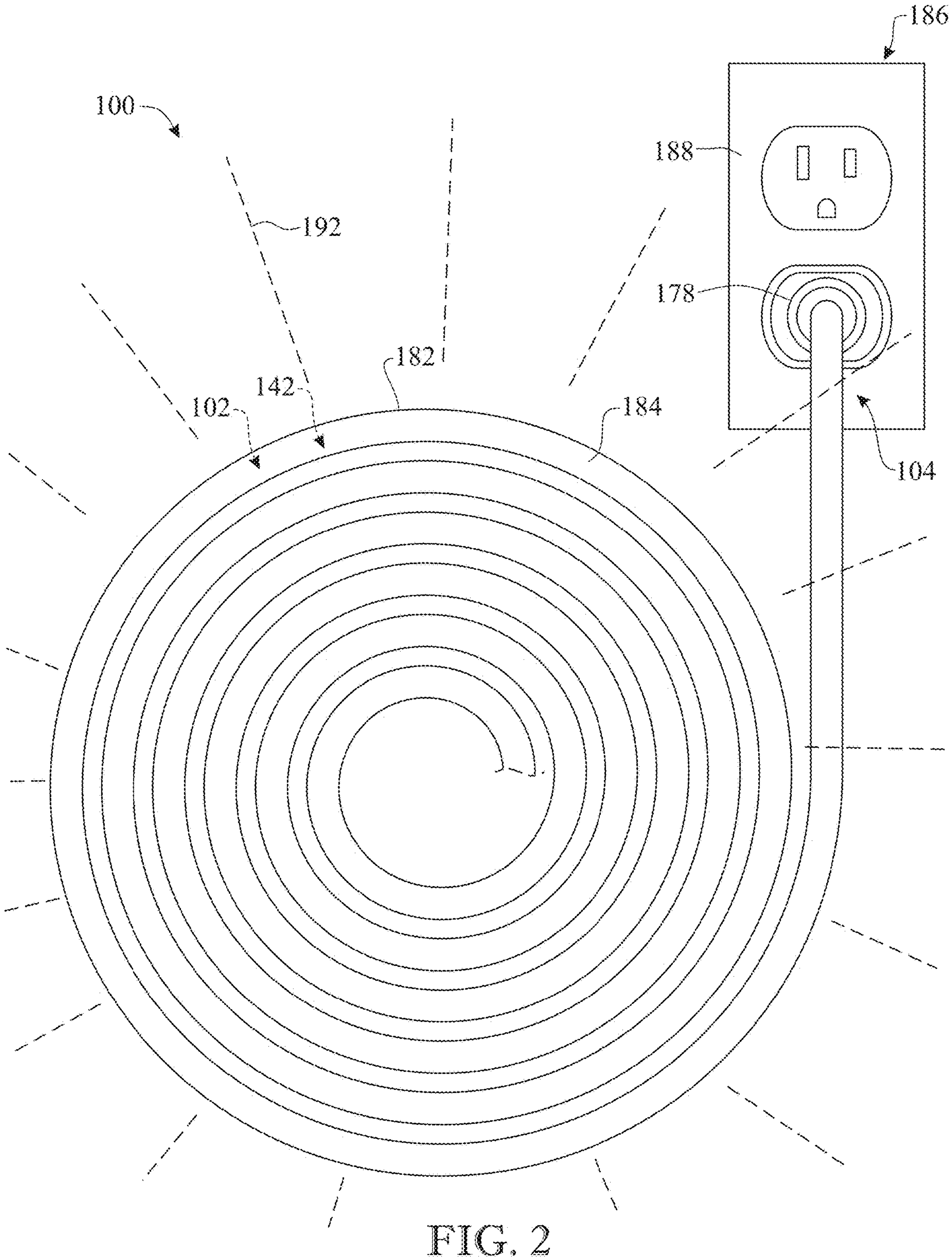
FIG. 2 presents a top view of the illuminable electrical cord illustrated in FIG. 1, with the power cord plug inserted in the electrical outlet.
Figure 3:
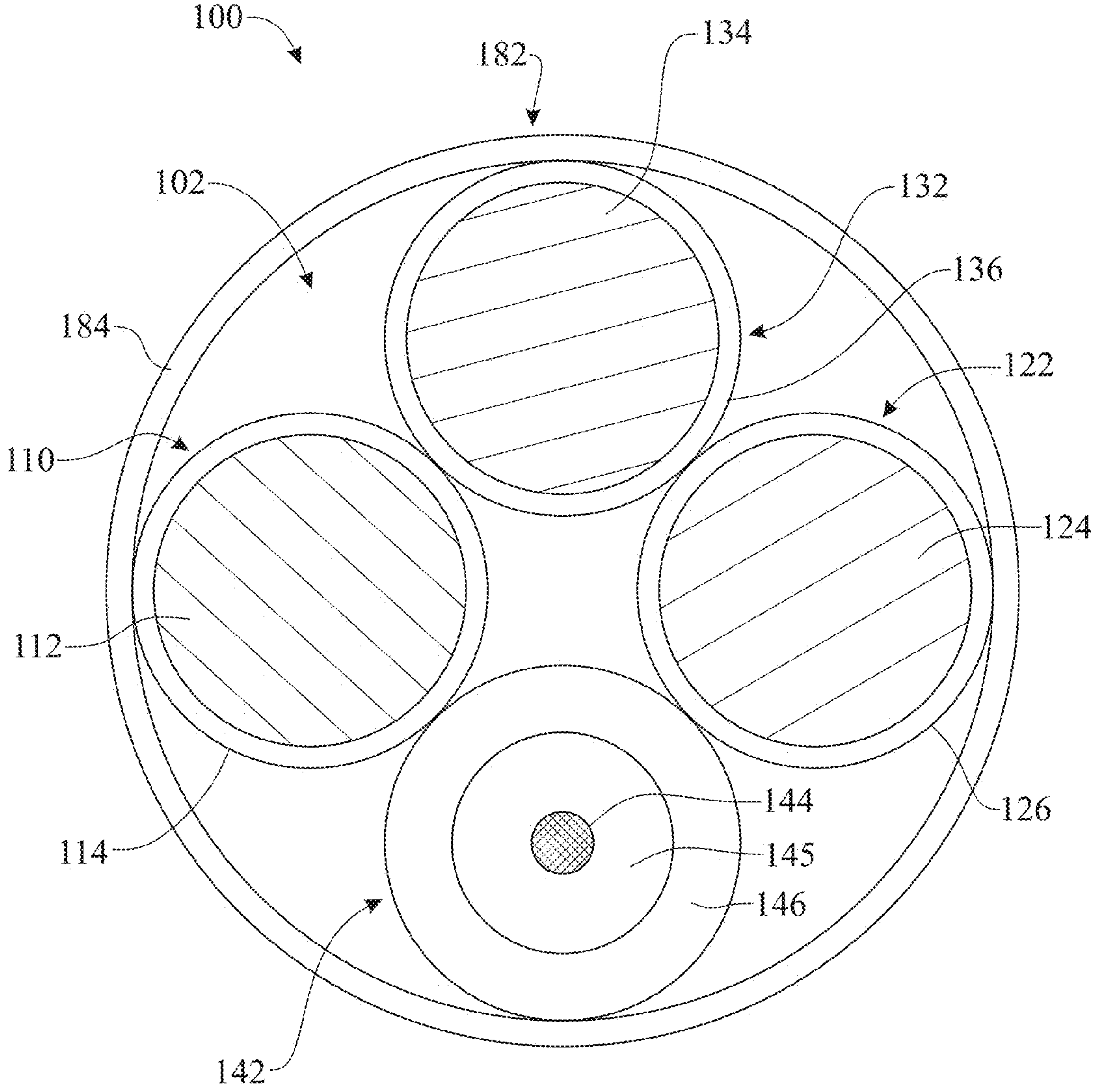
FIG. 3 presents a cross-sectional view of the illuminable electrical cord illustrated in FIGS. 1 and 2.
Figure 4:
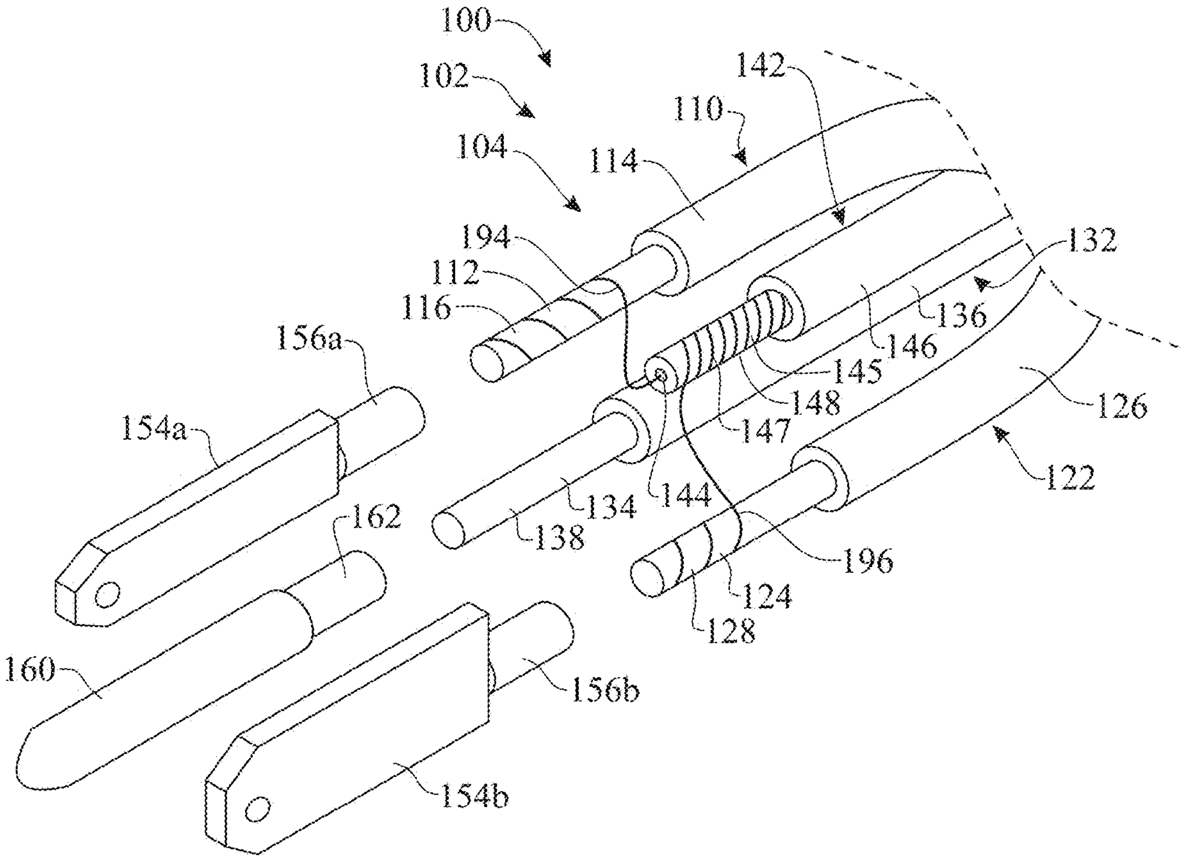
FIG. 4 presents an exploded perspective view of the first end of the cord bundle of the illuminable electrical cord.
Figure 5:
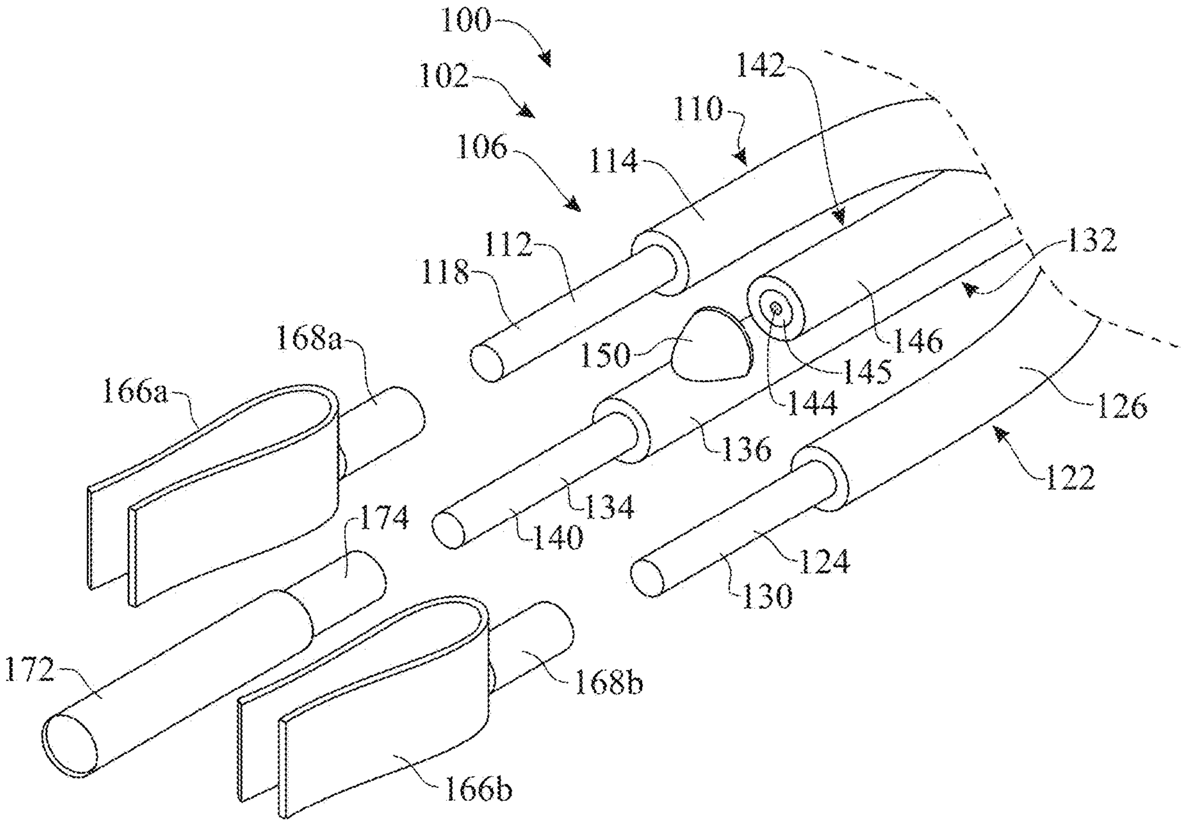
FIG. 5 presents an exploded perspective view of the second end of the cord bundle of the illuminable electrical cord.

Referring initially to FIGS. 1-5, an illuminable electrical cord, hereinafter electrical cord 100, is illustrated in accordance with an exemplary embodiment of the present invention. The electrical cord 100 may include a cord bundle 102 extending longitudinally along the electrical cord 100, the cord bundle 102 shown in cross section in FIG. 3. The cord bundle 102 may have a first end 104 (FIGS. 1, 2 and 4) and an opposite, second end 106 (FIG. 5). The first and second ends 104 and 106 are configured to connect to an electrical power source or electrical circuit configured to provide electrical power, and to an electrical power receiver or electrical circuit configured to receive electrical power, respectively, and the cord bundle 102 is configured to transport electrical power from the former to the latter. For instance, as illustrated in FIGS. 1 and 2, the first end 104 of the cord bundle 102 may be configured to electrically interface with an electrical power source 186 such as an electrical outlet 188. In some embodiments, the second end 106 of the cord bundle 102 may be configured to electrically interface with an electric device such as an electric tool or other appliance (not illustrated), for example and without limitation. The cord bundle 102 may transport electrical power from the electrical outlet 188 to the electric device in order to operate the electric device.

The cord bundle 102 may include at least one electroluminescent (EL) wire segment 142, which, as shown in FIGS. 3-5, may extend from the first end 104 to the second end 106 of the cord bundle 102. As illustrated in FIG. 2, the EL wire segment 142 may be configured to emit light 192 from the cord bundle 102 along at least a portion of the length of the cord bundle 102 as the cord bundle 102 conducts electrical current from the electrical power source 186 to the electric device, i.e. from the first end 104 of the cord bundle 102 to the second end 106 of the cord bundle 102. Accordingly, in an illustrative application, the first end 104 of the cord bundle 102 may be connected to the electrical power source 186. The electric device may be connected to the second end 106 of the cord bundle 102. In some applications, at least a portion of the cord bundle 102 may traverse through a dark or semi-dark environment from the electrical power source 186 to the electric device. In other applications, the cord bundle 102 may traverse through a lighted environment. As the electrical cord 100 remains connected to the electrical power source 186, the cord bundle 102 may conduct electrical current from the electrical power source 186 to the EL wire segment 142 of the cord bundle 102. The EL wire segment 142 may emit light which renders the cord bundle 102 more visible. The cord bundle 102 may simultaneously conduct electrical current from the electrical power source 186 to the electric device.

In some embodiments, the electrical cord 100 may be configured as an extension cord. For example and without limitation, the electrical cord 100 may have a length of from 25 feet to 100 feet in length. In other embodiments, alternative lengths for the electrical cord 100 are possible. The extension cord may be terminated in two different electrical connectors, such as, but not limited to, a plug and a socket as described hereinafter.

In some embodiments, the electrical cord 100 may include a cord sheath 182. The cord bundle 102 may extend through the cord sheath 182. The cord sheath 182 may include a cord sheath wall 184. The cord sheath wall 184 may be light transmissive (transparent or translucent), allowing light emitted by the EL wire segment 142, inside the cord sheath wall 184, to pass through the cord sheath wall 184 and thereby be visible from outside the electrical cord 100.

With reference to FIGS. 3-5, and initially to FIG. 3, the cord bundle 102 of the electrical cord 100 may include at least one power cord segment 110, 122. The at least one power cord segment 110, 122 may be configured to conduct the electrical current from the first end 104 of the cord bundle 102 to the second end 106 of the cord bundle 102, i.e. from the electrical power source 186 to the electric device.

The EL wire segment 142 may extend along and adjacent to the at least one power cord segment 110, 122.

In some embodiments, the at least one power cord segment 110, 122 of the cord bundle 102 may include a first power cord segment 110 and a second power cord segment 122. As illustrated in FIG. 3, the first power cord segment 110 may include an electrically conductive core 112. The core 112 may include at least one strand of an electrically conductive material such as copper. An electrically insulative sheath or cover 114 may surround the core 112.

As further illustrated in FIG. 3, the second power cord segment 122 may include an electrically conductive core 124. The core 124 may include at least one strand of an electrically conductive material such as copper. An electrically insulative sheath or cover 126 may surround the core 124.

The EL wire segment 142 of the present embodiment may include an electrically conductive core 144, made for instance of copper, which extends generally along the entire length of the EL wire segment 142. A luminescent layer 145, made for instance of phosphor, may extend longitudinally along and around the core 144, as known in the art. As shown in FIG. 4, a very fine wire or pair of wires, hereinafter referred to as angel wires 147, made for instance of copper, is spiral-wound around the luminescent layer 145, as shown; it should be noted that the illustration shows the angel wires 147 grouped into a single, resulting wire denoted by reference numeral 147. A protective cover 146 may extend along and around the angel wires 147 and the luminescent layer 145. As known in the art, the protective cover 146 is transparent or translucent, electrically insulative, and preferably configured to protect from humidity; for instance, the protective cover 146 may be formed by an internal, transparent PVC waterproof sheath and an external, translucent PVC protective cover (which may be colored to thereby define the illuminating EL wire segment color). The luminescent layer 145 is therefore arranged between the core 144 from the angel wires 147. In a preferred construction, the core 144, luminescent layer 145, cover 146 and angel wires 147 extend along the entire length of the EL wire segment 142, which in turn extends from the first end 104 to the second end 106 of the cord bundle 102.

With continued reference to FIG. 4, a first electrical interface 194 may electrically connect the EL wire segment 142 to the first power cord segment 110. A second electrical interface 196 may electrically connect the EL wire segment 142 to the second power cord segment 122. For instance, as shown, the first electrical interface 194 may be connected to the core 144 of the EL wire segment 142, and the second electrical interface 196 may be connected to the angel wires 147 of the EL wire segment 142. Each of the first electrical interface 194 and the second electrical interface 196 may include wiring and/or other electrically conductive structure or material which establishes electrical communication between the EL wire segment 142 (e.g., the core 144) and the first power cord segment 110 and between the EL wire segment 142 (e.g., the angel wires 147) and the second power cord segment 122, respectively. For instance and without limitation, the first and second electrical interfaces 194 and 196 may be made of copper.

As further illustrated in FIG. 4, in some embodiments, a first extending end 148 of the EL wire segment 142 may extend beyond the cover 146 of the EL wire segment 142 at the first end 104 of the cord bundle 102. The first extending end 148 may include an end portion of the angel wire 147, an end portion of the luminescent layer 145, and an end portion of the core 144, such that said end portions extend beyond the cover 146, as shown. Such an arrangement may facilitate connecting the first and second electrical interfaces 194 and 196 as heretofore described. Furthermore, as illustrated in FIG. 5, an electrically insulating cap 150 may be provided at the second end 106 of the cord bundle 102, positioned over the end of the EL wire segment 142, to electrically insulate the core 144 and the angel wires 147 (not shown) from outside elements and from one another at this end of the EL wire segment 142. The insulating cap 150 may include silicone, plastic, rubber, ceramic and/or other electrically insulative material or materials.

The cord bundle 102 may include a ground cord segment 132. In some embodiments, the ground cord segment 132 may include an electrically conductive core 134. The core 134 may include at least one strand of an electrically conductive material such as copper. An electrically insulative cover 136 may surround the core 134.

In some embodiments, the cover 114 of the first power cord segment 110, the cover 126 of the second power cord segment 122, and the cover 136 of the ground cord segment 132 may be color-coded. For example and without limitation, in some embodiments, the cover 114 of the first power cord segment 110 may be black, the cover 126 of the second power cord segment 122 may be white, and the cover 136 of the ground cord segment 132 may be green.

As illustrated in FIG. 4, a respective, power cord prong 154*a*, 154*b* may be provided on each one of the first power cord segment 110 and the second power cord segment 122 at the first end 104 of the cord bundle 102. A plug ground prong 160 may be provided on the ground cord segment 132 at the first end 104 of the cord bundle 102.

As illustrated in FIG. 5, a respective, power cord socket clip 166*a*, 166*b* may be provided on each one of the first power cord segment 110 and the second power cord segment 122 at the second end 106 of the cord bundle 102. A socket ground cavity 172 may be provided on the ground cord segment 132 at the second end 106 of the cord bundle 102.

As shown in FIGS. 4 and 5, a first extending end 116 (FIG. 4) and a second extending end 118 (FIG. 5) of the core 112 of the first power cord segment 110 may extend beyond the cover 114 of the first power cord segment 110 at the first end 104 and the second end 106, respectively, of the cord bundle 102. The power cord prong 154*a* (FIG. 4) may electrically interface with the first extending end 116 of the core 112 of the first power cord segment 110. In turn, the power cord socket clip 166*a* (FIG. 5) may electrically interface with the second extending end 118 of the core 112 of the first power cord segment 110.

Similarly, a first extending end 128 (FIG. 4) and a second extending end 130 (FIG. 5) of the core 124 of the second power cord segment 122 may extend beyond the cover 126 of the second power cord segment 122 at the first end 104 and the second end 106, respectively, of the cord bundle 102. The power cord prong 154*b* (FIG. 4) may electrically interface with the first extending end 128 of the core 124 of the second power cord segment 122. In turn, the power cord socket clip 166*b* (FIG. 5) may electrically interface with the second extending end 130 of the core 124 of the second power cord segment 122.

As further illustrated in FIG. 4, a respective insertion segment 156*a*, 156*b* may extend from each power cord prong 154*a*, 154*b*. The insertion segment 156*a* of power cord prong 154*a* may receive the first extending end 116 of the core 112, electrically connecting the first extending end 116 to the power cord prong 154*a*. In turn, the insertion segment 156*b* of power cord prong 154*b* may receive the first extending end 128 of the core 124 at the first end 104 of the cord bundle 102, electrically connecting the first extending end 128 to the power cord prong 154*b*.

As further illustrated in FIG. 5, a respective insertion segment 168*a*, 168*b* may extend from each power cord socket clip 166*a*, 166*b*. The insertion segment 168*a* of power cord socket clip 166*a* may receive the second extending end 118 of the core 112, electrically connecting the second extending end 118 to the power cord socket clip 166*a*. In turn, the insertion segment 168*b* of power cord socket clip 166*b* may receive the second extending end 130 of the second power cord segment 122 at the second end 106 of the cord bundle 102, electrically connecting the second extending end 130 to the power cord socket clip 166*b*.

A first extending end 138 (FIG. 4) and a second extending end 140 (FIG. 5) of the core 134 of the ground cord segment 132 may extend beyond the cover 136 of the ground cord segment 132 at the first end 104 and the second end 106, respectively, of the cord bundle 102. As illustrated in FIG. 4, the plug ground prong 160 may electrically interface with the first extending end 138. As illustrated in FIG. 5, the socket ground cavity 172 may electrically interface with the second extending end 140.

As illustrated in FIG. 4, an insertion segment 162 may extend from the plug ground prong 160. The insertion segment 162 may receive the first extending end 138 of the core 134 at the first end 104 of the cord bundle 102, electrically connecting the first extending end 138 to the plug ground prong 160. As illustrated in FIG. 5, an insertion segment 174 may extend from the socket ground cavity 172. The insertion segment 174 may receive the second extending end 140 of the core 134 at the second end 106 of the cord bundle 102, electrically connecting the second extending end 140 to the socket ground cavity 172.

Therefore, the power cord prong 154*a* and the power cord socket clip 166*a* are electrically connected via the core 112 of the first power cord segment 110. In turn, the power cord prong 154*b* and the power cord socket clip 166*b* are electrically connected via the core 124 of the second power cord segment 122. Additionally, the plug ground prong 160 and the socket ground cavity 172 are electrically connected via the core 134 of the ground core segment 132.

As illustrated in FIGS. 1 and 2, in some embodiments, a power cord plug 178 may be provided at the first end 104 of the cord bundle 102. The power cord prongs 154*a*, 154*b* and the plug ground prong 160 may form part of the power cord plug 178. A power cord socket (not illustrated) may be provided at the second end 106 of the cord bundle 102. The power cord socket clips 166*a*, 166*b* and the ground cavity 172 may be provided in the power cord socket.

As further illustrated in FIGS. 1 and 2, in some embodiments, the electrical power source 186 may include an electrical outlet 188. For example and without limitation, the electrical outlet 188 may be configured to supply AC power; in a non-limiting example, the electrical outlet 188 may be a standard 120 VAC, 60 Hz household electrical outlet. In some applications, the power cord plug 178 may be omitted from the first end 104 of the cord bundle 102. The first end 104 of the cord bundle 102 may be hardwired into electrical communication with the electrical power source 186 according to the knowledge of those skilled in the art.

As illustrated in FIGS. 1 and 2, in typical application, the electrical cord 100 may electrically connect an electric device (not illustrated) at the second end 106 of the cord bundle 102 to the electrical outlet 188 or other electrical power source 186 at the first end 104 of the cord bundle 102. Accordingly, in some embodiments, the power cord prongs 154*a*, 154*b* and the plug ground prong 160 of the power cord plug 178 of the electrical cord 100 may be inserted into the corresponding power prong slots 189 and ground prong opening 190 in the electrical outlet 188. The power prongs and ground prong on the plug (not illustrated) on the electric device may be inserted into the respective power cord socket clips 166*a*, 166*b* and socket ground cavity 172 in the socket of the electrical cord 100. In some applications, at least a portion of the electrical cord 100 may traverse through a dark or semi-dark environment in a crawlspace, attic, or the like. In other applications, the electrical cord 100 may traverse through a lighted environment.

Throughout operation of the electric device, the electrical power source 186 may supply an electric voltage and resulting electric current to the electrical cord 100 at the power cord plug 178. The electric current is divided between the cord bundle 102 and the EL wire segment 142. More specifically, part of the electric current supplied by the electrical power source 186 is transmitted or conducted by the first and second power cord segments 110 and 122 of the cord bundle 102 from the first end 104 (FIG. 4) to the second end 106 (FIG. 5) of the cord bundle 102, and further supplied to the electric device (e.g., tool) which is connected to the electrical cord 100 at the second end 106 of the cord bundle 102, such as via the power cord socket comprising the power cord socket clips 166*a*, 166*b*. In this way, the electrical cord 100 may conduct electrical power from the electrical power source 186 to the electric device (e.g., tool) through the respective first power cord segment 110 and second power cord segment 122 of the cord bundle 102, to power the electric device for operation.

The remaining part of the electric current supplied by the electrical power source 186 is supplied to the EL wire segment 142 by the alternating voltage supplied by the electrical power source 186 being applied to the core 144 and the angel wires 147 of the EL wire segment 142 via the first and second electrical interfaces 194 and 196, respectively. As a consequence of an alternating voltage being applied between the core 144 and the angel wires 147 of the EL wire segment 142, alternating current (i.e. the remaining part of the alternating current supplied by the electrical power source 186) circulates through the EL wire segment 142, causing the core 144 and angel wires 147 to become powered and thereby cause the luminescent layer 145 to emit light 192. The light 192 may pass through the transparent or translucent cover 146 of the EL wire segment 142, and further through the transparent or translucent outer, cord sheath wall 184 of the cord sheath 182 of the electrical cord 100, allowing the light 192 to project outward of the electrical cord 100 as shown in FIG. 2. This outwardly emitted light 192 illuminates the dark or semi-dark environment through which the electrical cord 100 traverses and renders the electrical cord 100 and the environment visible to workers and/or other personnel who access the work area, for safety purposes. In preferred embodiments, in which the EL wire segment 142 extends along the entire length of the cord bundle 102, i.e. along generally the entire length of the electrical cord 100, the electrical cord 100 illuminates generally in its entirety.

Figure 6:
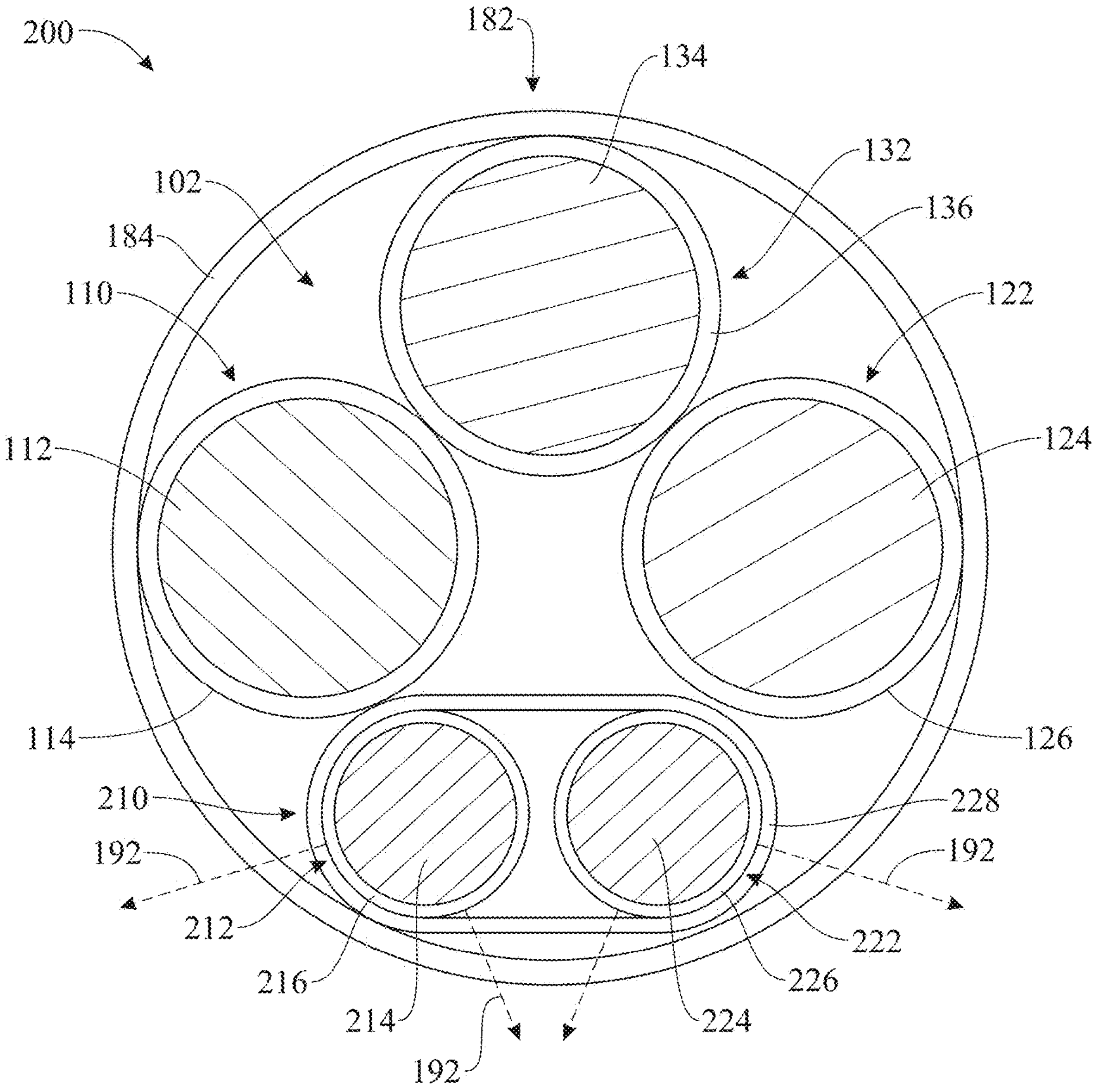
FIG. 6 presents a cross-sectional view of an illuminating electrical cord in accordance with a second illustrative embodiment of the present invention.
Figure 7:
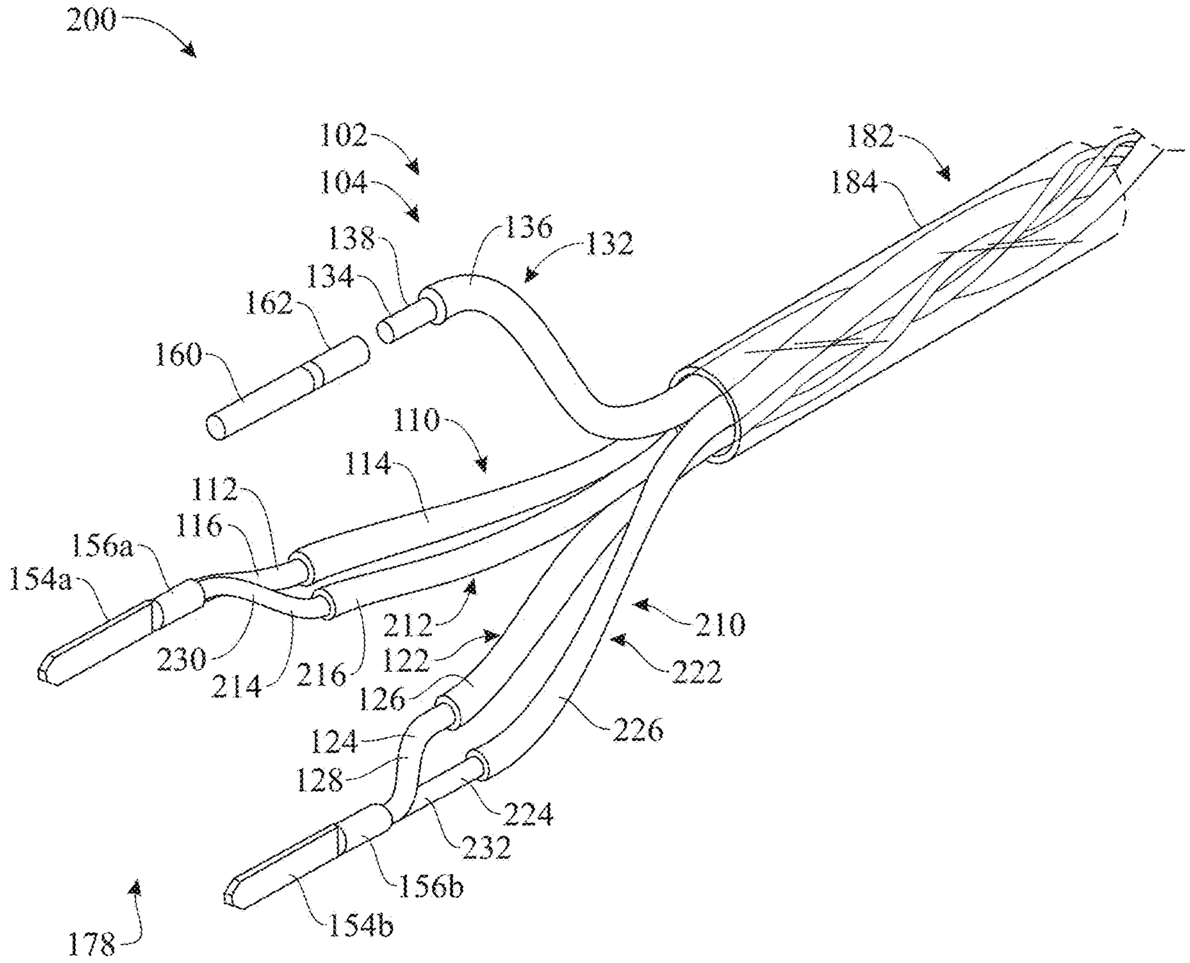
FIG. 7 presents a partially exploded, perspective view of the first end of the cord bundle of the illuminable electrical cord of FIG. 6.
Figure 8:
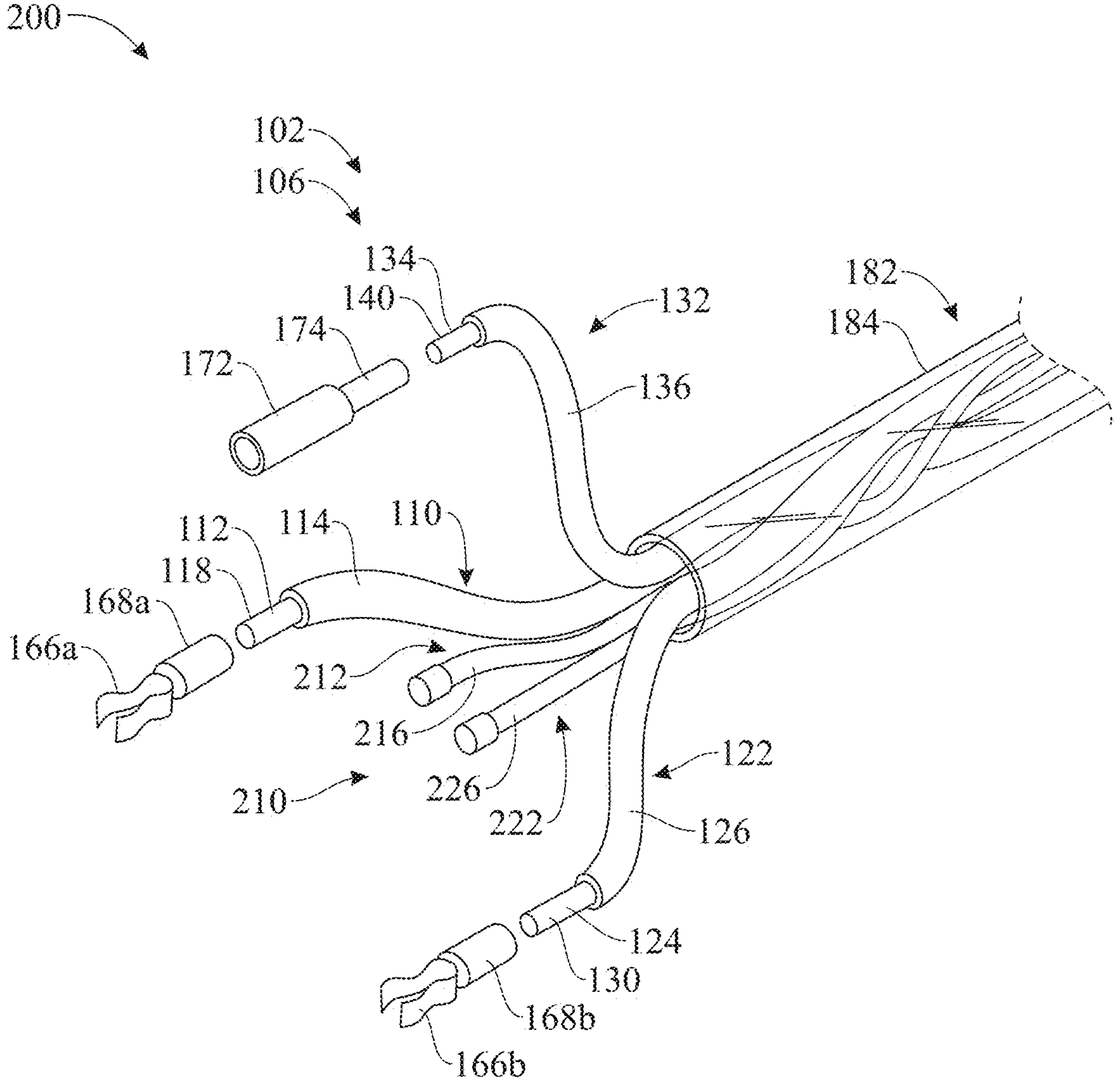
FIG. 8 presents a partially exploded, perspective view of the opposite, second end of the cord bundle of the illuminable electrical cord of FIG. 6.

The illustrations of FIGS. 6-8 show an electrical cord 200 in accordance with a second illustrative embodiment of the present invention. Elements which are the same as those of electrical cord 100 have been numbered using the same reference numerals as in FIGS. 1-5, and the detailed description of said elements provided heretofore is applicable to FIGS. 6-8 unless expressly indicated otherwise.

Similarly to the previous embodiment, the electrical cord 200 of the present embodiment includes a cord bundle 102 which is configured to transport electrical power for powering an electric device (e.g., electric tool), and to simultaneously illuminate from inside the electrical cord 200, allowing to view the electrical cord 200 in low-light or dark environments and to illuminate the surroundings of the electrical cord 200. Unlike the previous embodiment, however, the electrical cord 200 of the present embodiment uses an alternative type of EL wire, referred to hereinafter as EL wire segment 210, which does not include angel wires and instead is provided with two conductive cores. An example of such EL wire segment 210 is commercially known as TrueEL™ wire.

With specific reference to FIG. 6, the EL wire segment 210 of the present embodiment is comprised of a first EL segment 212 and a second EL segment 222. The first EL segment 212 has an electrically conductive core 214, made for instance of copper, and a luminescent layer 216, made for instance of phosphor, arranged along and extending around the core 214. Similarly, the second EL segment 222 comprises an electrically conductive core 224, made for instance of copper, and a luminescent layer 226, made for instance of phosphor, arranged along and extending around the core 224. One or more transparent or translucent, optionally colored, insulating and protective covers may extend around and along the first and second EL segments 212 and 222; for instance, the illustration of FIG. 6 shows a single cover 228 extending around and along both EL segments 212 and 222. It should be noted that the cover 228 has been omitted from FIGS. 7 and 8 for clarity purposes.

As with the previous embodiment, the EL wire segment 210 of the present embodiment may extend generally along the entire length of the cord bundle 102 formed by the first and second power cord segments 110 and 122 and the ground core segment 132, from the first end 104 (FIG. 7) to the opposite, second end 106 (FIG. 8) of the cord bundle 102.

Turning to FIG. 7, at the first end 104 of the cord bundle 102, the ground cord segment 132 may be connected to the plug ground prong 160 via the insertion segment 162 as was heretofore described with reference to the previous embodiment. The first EL segment 212 and the first power cord segment 110 may be electrically connected to one another, and the second EL segment 222 and the second power cord segment 122 may be electrically connected to one another. For example, in the depicted embodiment, the first EL segment 212 and the first power cord segment 110 are connected to one another and to the power cord prong 154*a* by receiving both an electrically conductive, first extending end 230 of the core 214 of the first EL segment 212 and the electrically conductive, first extending end 116 of the core 112 of the first power cord segment 110 within the insertion segment 156*a* of the power cord prong 154*a*. Similarly, the second EL segment 222 and the second power cord segment 122 are connected to one another and to the power cord prong 154*b* by receiving both an electrically conductive, first extending end 232 of the core 224 of the second EL segment 222 and the electrically conductive, first extending end 128 of the core 124 of the second power cord segment 122 within the insertion segment 156*b* of the power cord prong 154*b*.

Turning to FIG. 8, at the second end 106 of the cord bundle 102, the first power cord segment 110, the second power cord segment 122, and the ground cord segment 132 may be connected to the power cord socket clip 166*a*, the power cord socket clip 166*b*, and the socket ground cavity 172, respectively, via the respective insertion segment 168*a*, 168*b*, and 174, as was heretofore described with reference to the previous embodiment. In turn, a respective insulating cap 240, 242 may be attached to the end of each one of the first EL segment 212 and the second EL segment 222, to electrically insulate the ends from one another and from surrounding components. The insulating caps 240, 242 may be made of silicone, plastic, rubber, ceramic and/or other electrically insulative material or materials.

Operation of the electrical cord 200 may be similar to as was heretofore described with reference to the embodiment of FIGS. 1-5. For example, in one application of the present embodiment, the electrical cord 200 may electrically connect to an electrical power source (e.g., the electrical outlet 188 of the electrical power source 186 of FIGS. 1 and 2) at the first end 104 of the cord bundle 102 via the prongs 154*a*, 154*b*, 160 of the power cord plug 178. Additionally, the electrical cord 200 may electrically connect to an electric device (e.g., electric tool) at the second end 106 of the cord bundle 102 via the clips 166*a*, 166*b* and the cavity 172, respectively. In carrying out these connections, electrical communication is established from the electrical power source to the electric device via the electrical cord 200.

As with the previous embodiment, throughout operation of the electric device, the electrical power source 186 may supply an electric voltage and resulting electric current to the electrical cord 200 at the power cord plug 178. The electric current is divided between the cord bundle 102 and the EL wire segment 210. More specifically, part of the electric current supplied by the electrical power source 186 is transmitted or conducted by the first and second power cord segments 110 and 122 of the cord bundle 102 from the first end 104 (FIG. 7) to the second end 106 (FIG. 8) of the cord bundle 102, and further supplied to the electric device (e.g., tool) which is connected to the electrical cord 200 at the second end 106 of the cord bundle 102, such as via the power cord socket comprising the power cord socket clips 166*a*, 166*b*. In this way, the electrical cord 200 may conduct electrical power from the electrical power source 186 to the electric device (e.g., tool) through the respective first power cord segment 110 and second power cord segment 122 of the cord bundle 102, to power the electric device for operation.

The remaining part of the electric current supplied by the electrical power source 186 is supplied to the EL wire segment 210 by the alternating voltage supplied by the electrical power source 186 being applied to the cores 214 and 224 of the first and second EL segments 212 and 222, respectively, each of which is connected to a respective prong 154*a* and 154*b*. As a consequence of an alternating voltage being applied between the cores 214 and 224 of the first and second EL segments 212 and 222, respectively, alternating current (i.e. the remaining part of the alternating current supplied by the electrical power source 186) circulates through the EL wire segment 210, causing the cores 214 and 224 to become powered and thereby cause the luminescent layers 216 and 226 to emit light 192, as shown in FIG. 6. The light 192 may pass through the transparent or translucent cover 228 of the EL wire segment 210, and further through the transparent or translucent outer, cord sheath wall 184 of the cord sheath 182 of the electrical cord 200, allowing the light 192 to project outward of the electrical cord 200. As with the previous embodiment, the actual electrical cord 200 appears illuminated, and may illuminate the surroundings of the electrical cord 200. In preferred embodiments, in which the EL wire segment 210 extends along the entire length of the cord bundle 102, i.e. along generally the entire length of the electrical cord 200, the electrical cord 200 illuminates generally in its entirety.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An illuminable, electrical cord connectable between an electrical power source and an electric device, comprising:

a cord bundle having opposite, first and second ends, the cord bundle configured to conduct electricity from the first end to the second end, the cord bundle comprising a first power cord segment and a second power cord segment, wherein each one of the first and second power cord segments extends from the first end to the second end of the cord bundle; and an electroluminescent wire segment arranged along the cord bundle, the electroluminescent wire segment electrically connected to the cord bundle, wherein first and second electrically-conductive members of the electroluminescent wire segment are electrically connected to the first and second power cord segments of the cord bundle, respectively; wherein the electrical cord is configured to adopt a working configuration in which electrical power is supplied by the electrical power source to the first end of the cord bundle, and an electrical current associated with said electrical power is divided into a first electrical current and a second electrical current, wherein the first electrical current is conducted by the first and second power cord segments of the cord bundle to the second end of the cord bundle to cause a powering of the electric device, and further wherein the second electrical current is conducted by the first and second electrically-conductive members of the electroluminescent wire segment causing the electroluminescent wire segment to emit a light along at least a portion of the length of the cord bundle simultaneously to said powering of the electric device.

2. The electrical cord of claim 1, wherein the first electrically-conductive member of the electroluminescent wire segment includes one of an electrically-conductive core and a set of electrically-conductive, angel wires of the electroluminescent wire segment, and the second electrically-conductive member of the electroluminescent wire segment includes the other of the core and the set of angel wires of the electroluminescent wire segment.

3. The electrical cord of claim 1, wherein the first electrically-conductive member of the electroluminescent wire segment includes a first electrically-conductive core of the electroluminescent wire segment, and the second electrically-conductive member of the electroluminescent wire segment includes a second electrically-conductive core of the electroluminescent wire segment.

4. The electrical cord of claim 1, wherein the electroluminescent wire segment extends from the first end to the second end of the cord bundle.

5. The electrical cord of claim 1, wherein the electrical cord includes a plug end electrically connected to one of the first end and the second end of the cord bundle, the plug end configured to plug into an electrical socket.

6. The electrical cord of claim 1, wherein the first and second electrically-conductive members of the electroluminescent wire segment are electrically connected to the first and second power cord segments, respectively, at one of the first end and the second end of the cord bundle.

7. The electrical cord of claim 6, wherein the first and second electrically-conductive members of the electroluminescent wire segment are electrically connected to an extending end of a core of the first power cord segment and an extending end of a core of the second power cord segment, respectively, at one of the first end and the second end of the cord bundle.

8. The electrical cord of claim 7, wherein the electrical cord comprises an electrical plug at said one of the first end and the second end of the cord bundle, wherein the extending end of the core of the first power cord segment and the first electrically-conductive member of the electroluminescent wire segment are electrically connected to a first prong of the electrical plug, and the extending end of the core of the second power cord segment and the second electrically-conductive member of the electroluminescent wire segment are electrically connected to a second prong of the electrical plug.

9. The electrical cord of claim 1, wherein the first and second electrically-conductive members of the electroluminescent wire segment are electrically connected to the first and second power cord segments, respectively, at the first end of the cord bundle.

10. The electrical cord of claim 9, wherein the first and second electrically-conductive members of the electroluminescent wire segment are electrically connected to an extending end of a core of the first power cord segment and an extending end of a core of the second power cord segment, respectively, at the first end of the cord bundle.

11. The electrical cord of claim 1, wherein the electrical cord includes a socket end electrically connected to one of the first end and the second end of the cord bundle, the socket end configured to receive an electrical plug.

12. The electrical cord of claim 1, further comprising an electrical plug at one of the first and second ends of the cord bundle, and an electrical socket at the other of the first and second ends of the cord bundle, wherein the electrical plug and the electrical socket are in electrical connection via the cord bundle.

13. The electrical cord of claim 12, wherein the electroluminescent wire segment is electrically connected to the cord bundle at said electrical plug.

14. The electrical cord of claim 13, wherein the electrical plug comprises two or more prongs, each prong comprising a respective insertion segment, and further wherein the electroluminescent wire segment is electrically connected to the cord bundle at the insertion segments of the two or more prongs.

15. An illuminable, electrical cord connectable between an electrical power source and an electric device, comprising:

a cord bundle having opposite, first and second ends, the cord bundle configured to conduct electricity from the first end to the second end, the cord bundle comprising a first power cord segment and a second power cord segment, wherein each one of the first and second power cord segments extends from the first end to the second end of the cord bundle; and an electroluminescent wire segment arranged adjacent to and along the cord bundle, the electroluminescent wire segment electrically connected to the cord bundle, wherein first and second electrically-conductive members of the electroluminescent wire segment are electrically connected to the first and second power cord segments of the cord bundle, respectively; wherein the electrical cord is configured to adopt a working configuration in which electrical power is supplied by the electrical power source to the first end of the cord bundle, and an electrical current associated with said electrical power is divided into a first electrical current and a second electrical current, wherein the first electrical current is conducted by the first and second power cord segments of the cord bundle to the second end of the cord bundle to cause a powering of the electric device, and further wherein the second electrical current is conducted by the first and second electrically-conductive members of the electroluminescent wire segment causing the electroluminescent wire segment to emit a light along at least a portion of the length of the cord bundle simultaneously to said powering of the electric device.

16. An illuminable, electrical cord connectable between an electrical power source and an electric device, comprising:

a cord bundle having opposite, first and second ends, the cord bundle configured to conduct electricity from the first end to the second end, the cord bundle comprising a first power cord segment and a second power cord segment, wherein each one of the first and second power cord segments extends from the first end to the second end of the cord bundle; and an electroluminescent wire segment arranged adjacent to and along the cord bundle, the electroluminescent wire segment electrically connected to the cord bundle, wherein first and second electrically-conductive members of the electroluminescent wire segment are electrically connected to the first and second power cord segments of the cord bundle, respectively; and a light transmissive, outer sheath containing the cord bundle and the electroluminescent wire segment, wherein the electrical cord is configured to adopt a working configuration in which electrical power is supplied by the electrical power source to the first end of the cord bundle, and an electrical current associated with said electrical power is divided into a first electrical current and a second electrical current, wherein the first electrical current is conducted by the first and second power cord segments of the cord bundle to the second end of the cord bundle to cause a powering of the electric device, and further wherein the second electrical current is conducted by the first and second electrically-conductive members of the electroluminescent wire segment causing the electroluminescent wire segment to emit a light along at least a portion of the length of the cord bundle simultaneously to said powering of the electric device, wherein the outer sheath enables said light to pass from the electroluminescent wire segment to outside the electrical cord.

17. The electrical cord of claim 16, wherein the cord bundle is contained within the outer sheath.

18. An illuminable, electrical cord connectable between an electrical power source and an electric device, comprising:

a cord bundle having opposite, first and second ends, the cord bundle configured to conduct electricity from the first end to the second end;

a socket end electrically connected to one of the first end and the second end of the cord bundle, the socket end configured to receive an electrical plug; and an electroluminescent wire segment arranged along the cord bundle, the electroluminescent wire segment electrically connected to the cord bundle; wherein the electrical cord is configured to adopt a working configuration in which electrical power is supplied by the electrical power source to the first end of the cord bundle, and an electrical current associated with said electrical power is divided into a first electrical current and a second electrical current, wherein the first electrical current is conducted by the cord bundle to the second end of the cord bundle to cause a powering of the electric device, and further wherein the second electrical current flows through the electroluminescent wire segment causing the electroluminescent wire segment to emit a light along at least a portion of the length of the cord bundle simultaneously to said powering of the electric device.

19. An illuminable, electrical cord connectable between an electrical power source and an electric device, comprising:

a cord bundle having opposite, first and second ends, the cord bundle configured to conduct electricity from the first end to the second end;

an electrical plug at one of the first and second ends of the cord bundle;

an electrical socket at the other of the first and second ends of the cord bundle, wherein the electrical plug and the electrical socket are in electrical connection via the cord bundle; and an electroluminescent wire segment arranged along the cord bundle, the electroluminescent wire segment electrically connected to the cord bundle; wherein the electrical cord is configured to adopt a working configuration in which electrical power is supplied by the electrical power source to the first end of the cord bundle, and an electrical current associated with said electrical power is divided into a first electrical current and a second electrical current, wherein the first electrical current is conducted by the cord bundle to the second end of the cord bundle to cause a powering of the electric device, and further wherein the second electrical current flows through the electroluminescent wire segment causing the electroluminescent wire segment to emit a light along at least a portion of the length of the cord bundle simultaneously to said powering of the electric device.

20. The electrical cord of claim 19, wherein the electroluminescent wire segment is electrically connected to the cord bundle at said electrical plug.

21. The electrical cord of claim 20, wherein the electrical plug comprises two or more prongs, each prong comprising a respective insertion segment, and further wherein the electroluminescent wire segment is electrically connected to the cord bundle at the insertion segments of the two or more prongs.

* * * * *